(12) United States Patent
Rooney, III et al.

(10) Patent No.: US 9,440,717 B2
(45) Date of Patent: Sep. 13, 2016

(54) HULL ROBOT

(75) Inventors: James H. Rooney, III, Harvard, MA (US); Jonathan T. Longley, Andover, MA (US); Joel N. Harris, Westborough, MA (US); Fraser Smith, Salt Lake City, UT (US); Stephen C. Jacobsen, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 1075 days.

(21) Appl. No.: 12/313,643

(22) Filed: Nov. 21, 2008

(65) Prior Publication Data

US 2010/0126403 A1    May 27, 2010

(51) Int. Cl.
    *B63B 59/10*     (2006.01)
    *G05D 1/02*     (2006.01)

(52) U.S. Cl.
    CPC .............. *B63B 59/10* (2013.01); *G05D 1/0227* (2013.01); *G05D 1/0274* (2013.01); *G05D 1/0276* (2013.01); *Y02T 70/32* (2013.01)

(58) Field of Classification Search
    CPC ....... B63B 59/10; B63B 59/08; B63B 59/06; B05D 1/027; G05D 1/0276; G05D 1/0274; G05D 1/0272; G05D 1/0219; G05D 1/0227; H01F 7/04; Y02T 70/32
    USPC ............................. 114/222; 700/245; 901/1
    See application file for complete search history.

(56) References Cited

U.S. PATENT DOCUMENTS

| | | | |
|---|---|---|---|
| 2,104,062 A | 1/1938 | Temple | |
| 2,132,661 A | 10/1938 | Temple | |
| 2,386,650 A | 10/1945 | Bell | |
| 3,058,783 A | 10/1962 | Wadsworth et al. | |
| 3,088,429 A | 5/1963 | Johannessen | |
| 3,285,676 A | 11/1966 | Hetteen | |
| 3,439,937 A | 4/1969 | Dixon | |
| 3,554,300 A | 1/1971 | Rosenberg | |
| 3,638,600 A | 2/1972 | Modrey | |
| 3,682,265 A | 8/1972 | Hiraoka et al. | |
| 3,750,129 A | 7/1973 | Takeno et al. | |
| 3,777,834 A | 12/1973 | Hiraoka et al. | |
| 3,906,572 A * | 9/1975 | Winn | A47L 11/4011 114/222 |
| 3,922,991 A * | 12/1975 | Woods | B63B 59/10 114/222 |
| 3,934,664 A | 1/1976 | Pohjola | |
| 3,946,692 A | 3/1976 | Sierra et al. | |
| 3,960,229 A * | 6/1976 | Shio | B62D 55/265 114/222 |

(Continued)

FOREIGN PATENT DOCUMENTS

| | | |
|---|---|---|
| CN | 2405719 | 11/2000 |
| CN | 2552648 | 5/2003 |

(Continued)

OTHER PUBLICATIONS

Lee Min Wai Serene and Koh Cheok Wei, "Design of a Remotely Operated Vehicle (ROV) for Underwater Ship Hull Cleaning," National University of Singapore, 2003, pp. 1-6.

(Continued)

*Primary Examiner* — Stephen Holwerda

(57) ABSTRACT

A hull cleaning robot includes at least one cleaning apparatus for cleaning the hull of a vessel, at least one drive track holding the robot on the hull as the robot maneuvers about the hull, and at least one turbine actuatable by water flowing past the hull for operating the at least one drive track and, optionally, the cleaning apparatus.

22 Claims, 13 Drawing Sheets

(56) References Cited

U.S. PATENT DOCUMENTS

| | | | |
|---|---|---|---|
| 3,984,944 A | 10/1976 | Maasberg et al. | |
| 4,046,429 A | 9/1977 | Pohjola | |
| 4,079,694 A | 3/1978 | Galinou | |
| 4,119,356 A | 10/1978 | Pohjola | |
| 4,135,492 A | 1/1979 | Heitland | |
| 4,202,453 A | 5/1980 | Wilkes et al. | |
| 4,251,791 A | 2/1981 | Yanagisawa et al. | |
| 4,401,048 A | 8/1983 | Rogers | |
| 4,444,146 A | 4/1984 | DeWitz et al. | |
| 4,574,722 A * | 3/1986 | Orita et al. | 114/222 |
| 4,674,949 A | 6/1987 | Kroczynski | |
| 4,690,092 A * | 9/1987 | Rabuse | 114/222 |
| 4,697,536 A | 10/1987 | Hirata | |
| 4,697,537 A | 10/1987 | Smith | |
| 4,734,954 A | 4/1988 | Greskovics et al. | |
| 4,736,826 A | 4/1988 | White et al. | |
| 4,788,498 A | 11/1988 | Uemura | |
| 4,789,037 A | 12/1988 | Kneebone | |
| 4,809,383 A | 3/1989 | Urakami | |
| 4,841,894 A | 6/1989 | Nellessen, Jr. | |
| 4,890,567 A | 1/1990 | Caduff | |
| 4,926,775 A | 5/1990 | Andorsen | |
| 5,048,445 A | 9/1991 | Lever et al. | |
| 5,174,222 A * | 12/1992 | Rogers | 114/222 |
| 5,203,646 A * | 4/1993 | Landsberger | B08B 9/049 |
| | | | 104/138.2 |
| 5,253,605 A | 10/1993 | Collins | |
| 5,253,742 A | 10/1993 | Dooley | |
| 5,285,601 A | 2/1994 | Watkin et al. | |
| 5,337,434 A | 8/1994 | Erlich | |
| 5,366,038 A | 11/1994 | Hidetsugu et al. | |
| 5,378,994 A | 1/1995 | Novak et al. | |
| 5,435,405 A | 7/1995 | Schempf et al. | |
| 5,569,371 A * | 10/1996 | Perling | E04H 4/1654 |
| | | | 15/1.7 |
| 5,628,271 A | 5/1997 | McGuire | |
| 5,831,432 A | 11/1998 | Mohri | |
| 5,849,099 A | 12/1998 | McGuire | |
| 5,852,984 A | 12/1998 | Matsuyama et al. | |
| 5,884,642 A | 3/1999 | Broadbent | |
| 5,894,901 A | 4/1999 | Awamura et al. | |
| 5,947,051 A * | 9/1999 | Geiger | B62D 57/00 |
| | | | 114/222 |
| 6,000,484 A | 12/1999 | Zoretich et al. | |
| 6,053,267 A | 4/2000 | Fisher | |
| 6,064,708 A | 5/2000 | Sakamaki | |
| 6,102,145 A | 8/2000 | Fisher | |
| 6,125,955 A | 10/2000 | Zoretich et al. | |
| 6,209,473 B1 | 4/2001 | Jones et al. | |
| 6,276,478 B1 | 8/2001 | Hopkins et al. | |
| 6,317,387 B1 | 11/2001 | D'Amaddio et al. | |
| 6,564,815 B2 | 5/2003 | McGuire | |
| 6,595,152 B2 | 7/2003 | McGuire | |
| 6,698,375 B2 | 3/2004 | Delfosse | |
| 6,698,376 B2 | 3/2004 | Delahousse et al. | |
| 6,792,335 B2 | 9/2004 | Ross et al. | |
| 6,886,486 B2 | 5/2005 | Van Rompay | |
| 6,886,651 B1 | 5/2005 | Slocum et al. | |
| 7,286,214 B2 | 10/2007 | Reinersman et al. | |
| 7,290,496 B2 | 11/2007 | Asfar et al. | |
| 7,296,530 B1 | 11/2007 | Bernstein et al. | |
| 7,390,560 B2 | 6/2008 | Wallach | |
| 7,496,226 B2 | 2/2009 | Negahdaripour et al. | |
| 7,520,356 B2 | 4/2009 | Sadegh et al. | |
| 7,866,421 B2 | 1/2011 | Moore et al. | |
| 7,934,575 B2 | 5/2011 | Waibel et al. | |
| 8,109,383 B1 | 2/2012 | Suderman et al. | |
| 8,214,081 B2 | 7/2012 | Choi et al. | |
| 8,342,281 B2 | 1/2013 | Rooney, III | |
| 8,386,112 B2 | 2/2013 | Rooney, III | |
| 8,393,286 B2 | 3/2013 | Rooney, III et al. | |
| 8,393,421 B2 | 3/2013 | Kornstein et al. | |
| 8,723,536 B2 | 5/2014 | Miyazaki et al. | |
| 8,985,250 B1 | 3/2015 | Lussier et al. | |
| 2003/0000445 A1 | 1/2003 | McGuire | |
| 2004/0089216 A1 | 5/2004 | Van Rompay | |
| 2004/0133999 A1 | 7/2004 | Walton | |
| 2004/0250934 A1 | 12/2004 | Hamdan | |
| 2005/0027412 A1* | 2/2005 | Hobson et al. | 701/21 |
| 2005/0156562 A1 | 7/2005 | Cohen et al. | |
| 2005/0199171 A1 | 9/2005 | Eckland | |
| 2005/0216125 A1 | 9/2005 | Huston et al. | |
| 2006/0175439 A1 | 8/2006 | Steur et al. | |
| 2006/0191457 A1 | 8/2006 | Murphy | |
| 2006/0249622 A1 | 11/2006 | Steele | |
| 2006/0261772 A1 | 11/2006 | Kim | |
| 2007/0089916 A1 | 4/2007 | Lundstrom | |
| 2007/0276552 A1 | 11/2007 | Rodocker et al. | |
| 2007/0284940 A1 | 12/2007 | Koolhiran | |
| 2008/0009984 A1 | 1/2008 | Lee et al. | |
| 2008/0202405 A1 | 8/2008 | Kern | |
| 2008/0276407 A1 | 11/2008 | Schnittman et al. | |
| 2008/0281470 A1 | 11/2008 | Gilbert, Jr. et al. | |
| 2008/0300821 A1 | 12/2008 | Frank et al. | |
| 2008/0308324 A1 | 12/2008 | Moser et al. | |
| 2009/0078484 A1 | 3/2009 | Kocijan | |
| 2009/0094765 A1 | 4/2009 | Osaka et al. | |
| 2009/0166102 A1 | 7/2009 | Waibel et al. | |
| 2009/0301203 A1 | 12/2009 | Brussieux | |
| 2010/0000723 A1 | 1/2010 | Chambers | |
| 2010/0126403 A1 | 5/2010 | Rooney, III et al. | |
| 2010/0131098 A1 | 5/2010 | Rooney, III et al. | |
| 2010/0217436 A1 | 8/2010 | Jones et al. | |
| 2010/0219003 A1 | 9/2010 | Rooney, III et al. | |
| 2010/0238050 A1 | 9/2010 | Rhodes et al. | |
| 2011/0050374 A1 | 3/2011 | Dvorak | |
| 2011/0067615 A1 | 3/2011 | Rooney, III et al. | |
| 2011/0083599 A1 | 4/2011 | Kornstein et al. | |
| 2012/0006352 A1 | 1/2012 | Holappa et al. | |
| 2012/0215348 A1 | 8/2012 | Skrinde | |
| 2014/0076223 A1 | 3/2014 | Smith | |
| 2014/0076224 A1 | 3/2014 | Smith | |
| 2014/0076225 A1 | 3/2014 | Smith | |
| 2014/0076226 A1 | 3/2014 | Smith | |
| 2014/0077587 A1 | 3/2014 | Smith | |
| 2014/0081504 A1 | 3/2014 | Smith | |

FOREIGN PATENT DOCUMENTS

| | | |
|---|---|---|
| CN | 1864944 A | 11/2006 |
| CN | 101387687 A | 3/2009 |
| DE | 3611750 A1 * | 10/1987 |
| EP | 1785552 A2 | 5/2007 |
| FR | 1352056 A | 2/1964 |
| FR | 2861457 A1 | 4/2005 |
| FR | 2948920 A1 | 2/2011 |
| GB | 2038721 A | 7/1980 |
| GB | 2103162 | 2/1983 |
| GB | 21675330 | 4/1986 |
| JP | S48-014096 | 2/1973 |
| JP | S49-001434 | 1/1974 |
| JP | S5012797 | 2/1975 |
| JP | S50-81487 U | 7/1975 |
| JP | S58-12075 | 1/1983 |
| JP | S58-14096 | 1/1983 |
| JP | S60-013117 | 1/1985 |
| JP | S60-131174 A | 7/1985 |
| JP | S62-13099 | 8/1987 |
| JP | H04-02592 | 1/1992 |
| JP | H05-19086 | 1/1993 |
| JP | H06-099888 | 4/1994 |
| JP | H08-310384 | 11/1996 |
| JP | H10-16884 | 1/1998 |
| JP | 2003025265 | 1/2003 |
| JP | 2005335882 | 12/2005 |
| WO | WO 99/074489 A1 | 2/1999 |
| WO | WO 02/074611 A2 | 9/2002 |
| WO | WO 02/074611 A3 | 9/2002 |
| WO | WO 03/087501 A1 | 10/2003 |
| WO | WO 2005/014387 A1 | 2/2005 |
| WO | WO 2007/137234 A2 | 11/2007 |
| WO | WO 2010/134022 A1 | 11/2010 |

(56) References Cited

FOREIGN PATENT DOCUMENTS

| WO | WO 2011015786 A1 | 2/2011 |
|---|---|---|
| WO | WO 2011/146103 | 11/2011 |
| WO | WO 2012/104109 A1 | 8/2012 |

OTHER PUBLICATIONS

Fu-cai et al., "The Design of Underwater Hull-Cleaning Robot," *Journal of Marine Science and Application*, vol. 3, No. 1, Jun. 2004, pp. 41-45.
Written Opinion of the International Searching Authority for PCT Application No. PCT/US2009/006122 mailed Feb. 3, 2010 (seven (7) pages).
Written Opinion of the International Searching Authority, International Application No. PCT/US2010/002693, Dec. 9, 2010, 8 pgs. (unnumbered).
U.S. Appl. No. 12/800,174, filed May 10, 2010; James H. Rooney, III; office action issued Feb. 24, 2012.
U.S. Appl. No. 12/583,346, filed Aug. 19, 2009, Rooney III et al.
U.S. Appl. No. 12/586,248, filed Sep. 18, 2009, Rooney III et al.
U.S. Appl. No. 12/587,949, filed Oct. 14, 2009, Kornstein et al.
Borchardt, John, Grooming the Fleet, Mechanical Engineering, vol. 132/No. 4 Apr. 2010, pp. 33-35.
S. Reed, A. Cormack, K. Hamilton, I. Tena Ruiz, and D. Lane. "*Automatic Ship Hull Inspection using Unmanned Underwater Vehicles*,"Proceedings from the 7$^{th}$ International Symposium on Technology and the Mine Problem. Monterey, USA. May 2006 (10 pages).
Vaganay, J., Elkins, M., Espositio, D., Oapos, Halloran, W., Hover, F., Kokko, M. *Ship Hull Inspection with the HAUV: US Navy and NATO Demonstrations Results*, OCEANS 2006, vol., Issue, Sep. 18-21, 2006, pp. 1-6.
Townsin, R.L., The Ship Hull Fouling Penalty, Biofouling, Jan. 2003, vol. 19, (supplement), Jan. 1, 2003, pp. 9-15.
Rosenhahn et al., Advanced Nanostructures for the Control of Biofouling: The FP 6 EU Integrated Project AMBIO, Biointerphases 3(1) Mar. 2008, published Feb. 21, 2008; pp. IR1-IR5.
Preiser et al., Energy (Fuel) Conservation Through Underwater Removal and Control of Fouling on Hulls of Navy Ships, Naval Research and Development Center, Materials Department, Annapolis, Research and Development Report, Dec. 1975, 52 pgs.
Man, B&W, Basic Principles of Ship Propulsion, Basics of Ship Propulsion, pp. 1-30, Apr. 2004.
A Copenhagen Climate Treaty, Version 1.0 Draft, A Proposal for a Copenhagen Agreement by Members of the NGO Community, published Jun. 2009, pgs. 1-78 (80 pages total).
Yuan, et al., The Design of Underwater Hull-Cleaning Robot, Journal of Marine Science and Application, vol. 3, No. 1, Jun. 2004, pp. 41-45.
Tallett, et al., Potential Marine Fuels Regulations: Impacts on Global Refining, Costs & Emissions, Joint IFQC & IPIECA Roundtable: Impacts of CO2 Emissions from Refining & Shipping, London, England Oct. 1, 2007, 17 pgs.
RTI International, EnSys Energy & Systems, Inc., Navigistics Consulting; Global Trade and Fuels Assessment—Future Trends and Effects of Designating Requiring Clean Fuels in the Marine Sector: Task Order No. 1, Draft Report, RTI Project No. 0209701.001, Apr. 2006 (82 pages total).
Anti-Fouling Systems, Focus on IMO, International Maritime Organization, UK, 2002, pp. 1-31. http://www.uscg.mil/hq/cg5/cg522/cg5224/docs/FOULING2003.pdf.
Fernandez, Linda, NAFTA and Member Country Strategies for Maritime Trade and Marine Invasive Species, Journal of Environmental Management 89, 2008, pp. 308-321.
Munk, Torben, Fuel Conservation Through Managing Hull Resistance, Motorship Propulsion Conference, Copenhagen, Apr. 26, 2006 pp. 1-10.
Kohli, Nikita, Biofouling and Design of a Biomimetic Hull-Grooming Tool, Naval Surface Warfare Center Carderock Division, West Bethesda, MD, NSWCCD-CISD-2007/002, Ship Systems Integration & Design Department Technical Report, Sep. 2007, 38 pages total.
Written Opinion of the International Searching Authority, International Application No. PCT/US2011/000787, Jul. 20, 2011, 7 pgs. (unnumbered).
Written Opinion of the International Searching Authority, International Application No. PCT/US2011/000770, Aug. 9, 2011, 5 pgs. (unnumbered).
U.S. Appl. No. 12/800,486, filed May 17, 2010, James H. Rooney, III.
Written Opinion of the International Searching Authority, International Application No. PCT/US2010/002163, Oct. 13, 2010, 5 pgs. (unnumbered).
Written Opinion of the International Searching Authority, International Application No. PCT/US2010/002164, Oct. 8, 2010, 5 pgs. (unnumbered).
U.S. Appl. No. 12/586,248, filed Sep. 18, 2009; James H. Rooney III; office action issued May 24, 2012.
U.S. Appl. No. 12/587,949, filed Oct. 14, 2009; Howard R. Kornstein; office action issued May 25, 2012.
U.S. Appl. No. 12/583,346, filed Aug. 19, 2009; James H. Rooney, III; office action dated Feb. 27, 2013.
U.S. Appl. No. 12/800,174, filed May 10, 2010; James H. Rooney III; notice of allowance dated Aug. 17, 2012.
U.S. Appl. No. 12/587,949, filed Oct. 14, 2009; Howard R. Kornstein; notice of allowance dated Sep. 21, 2012.
U.S. Appl. No. 12/583,346, filed Aug. 19, 2009; James H. Rooney III; office action dated Sep. 25, 2012.
U.S. Appl. No. 12/800,486, filed May 17, 2010; James H. Rooney III; notice of allowance dated Sep. 27, 2012.
U.S. Appl. No. 12/586,248, filed Sep. 18, 2009; James H. Rooney III; notice of allowance dated Oct. 24, 2012.
Paik et al.; Condition Assessment of Aged Ships; Proceedings of the 16$^{th}$ International Ship and Offshore Structures Congress; Dec. 31, 2006; pp. 265-315; vol. 2; 16$^{th}$ International Ship and Offshore Structures Congress, Southampton, UK.
EP Application 09827853; filing date Nov. 8, 2011; Raytheon Company; Extended European Search Report dated Apr. 23, 2014.
PCT Application PCT/US2013/059550; filing date Sep. 12, 2013; Raytheon Company; International Search Report mailed Jun. 3, 2014.
PCT Application PCT/US2013/059548; filing date Sep. 12, 2013; Raytheon Company; International Search Report mailed Jun. 30, 2014.
U.S. Appl. No. 12/583,346, filed Aug. 19, 2009; James H. Rooney III; office action dated Feb. 27, 2014.
U.S. Appl. No. 12/313,643, filed Nov. 21, 2008; James H. Rooney III; office action dated Feb. 26, 2014.
U.S. Appl. No. 13/794,594, filed Mar. 11, 2013; Howard R. Kornstein; office action dated May 1, 2014.
PCT Application PCT/US2013/059546; filing date Sep. 12, 2013; Raytheon Company; International Search Report dated Jan. 20, 2014.
PCT Application PCT/US2013/059552; filing date Sep. 12, 2013; Raytheon Company; International Search Report dated Feb. 21, 2014.
PCT Application PCT/US2013/059548; filing date Sep. 12, 2013; Raytheon Company; International Search Report dated Apr. 16, 2014.
PCT Application PCT/US2013/059527; filing date Sep. 12, 2013; Raytheon Company; International Search Report dated Mar. 3, 2014.
PCT Application PCT/US2013/059551; filing date Sep. 12, 2013; Raytheon Company; International Search Report Mar. 10, 2014.
PCT Application PCT/US2013/059527; filing date Sep. 12, 2013; Raytheon Company; International Search Report May 13, 2014.
U.S. Appl. No. 13/769,339, filed Feb. 17, 2013; Fraser M. Smith; Notice of Allowance mailed Jan. 30, 2015.
U.S. Appl. No. 13/769,337, filed Feb. 17, 2013; Fraser M. Smith; Notice of Allowance mailed Feb. 10, 2015.
U.S. Appl. No. 13/794,594, filed Mar. 11, 2013; Howard R. Kornstein; office action dated Mar. 4, 2015.

(56) References Cited

OTHER PUBLICATIONS

U.S. Appl. No. 13/769,344, filed Feb. 17, 2013; Fraser M. Smith; office action dated Mar. 10, 2015.
U.S. Appl. No. 13/769,342, filed Feb. 17, 2013; Fraser M. Smith; office action dated Mar. 10, 2015.
U.S. Appl. No. 13/769,337, filed Feb. 17, 2013; Fraser M. Smith; office action dated Sep. 3, 2014.
U.S. Appl. No. 13/769,339, filed Feb. 17, 2013; Fraser M. Smith; office action dated Sep. 3, 2014.
U.S. Appl. No. 13/769,342, filed Feb. 17, 2013; Fraser M. Smith; office action dated Sep. 10, 2014.
U.S. Appl. No. 13/769,345, filed Feb. 17, 2013; Fraser M. Smith; office action dated Sep. 16, 2014.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; 30th International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/794,594, filed Mar. 11, 2013; Howard R. Kornstein; office action dated Oct. 15, 2014.
U.S. Appl. No. 13/769,344, filed Feb. 17, 2013; Fraser M. Smith; office action dated Oct. 28, 2014.
U.S. Appl. No. 13/769,345, filed Feb. 17, 2013; Fraser M. Smith; Notice of Allowance mailed Jan. 12, 2015.
PCT Application PCT/US2013/059552;filing date Sep. 12, 2013; Raytheon Company; International Search Report dated Dec. 20, 2013.
U.S. Appl. No. 12/583,346, filed Aug. 19, 2009; James H. Rooney III; office action dated Aug. 26, 2014.
U.S. Appl. No. 12/583,346, filed Aug. 19, 2009; James H. Rooney III; office action dated Apr. 8, 2015.
European Search Report for application 10823726.4 dated Jun. 23, 2015, 104 pages.
European Search Report for application EP10817533 dated Jul. 3, 2015, 124 pages.
Office Action for Chinese application 201180031384.8 dated Jun. 1, 2015, 14 pages including English translation.
Collins English Dictionary, "About", http://dictionary.reference.com/browse/about, Complete and Unabridged 10th edition, 2012, pp. 1, HarperCollins Publishers.
Office Action for Japanese application 2014-234710 dated Nov. 16, 2015, 13 pages including English translation.

\* cited by examiner

HULL ROBOT

FIELD OF THE INVENTION

The subject invention relates to a hull robot typically configured to clean and/or inspect the hull of a vessel.

BACKGROUND OF THE INVENTION

The frictional resistance of a vessel hull as it moves through the water can constitute 45% to 90% of the total resistance and may be increased by 6% up to 80% due to the fouling of the hull by algae, sea grass, barnacles, and the like. An added resistance of 30% due to moderate biofouling of a tanker hull can increase the fuel consumption of the vessel by twelve tons per day. The result is added cost to operate the vessel and increased emissions.

Accordingly, there are a variety of methods employed to lower the chance of bio-fouling and/or to clean the hull of vessels. For example, hull paints and coatings are used in an effort to decrease the chance of bio-fouling, but such treatments do not always work reliably. See, for example, U.S. Pat. No. 7,390,560 incorporated by reference herein. Also, the vessel must be dry docked for an extensive period of time while the paint and/or coating is applied. There are also environmental concerns with anti-fouling paints and coatings.

So, typically, while the ship is dockside and/or during normal unloading conditions, the hull is periodically cleaned manually by scuba divers using motorized brushes. The cost of such a cleaning procedure is high This type of cleaning effort is repeated approximately every ten to twenty months or sooner if needed. Worse, some jurisdictions have made this practice illegal due to the toxicity of anti-fouling paint which contaminates the water.

In response, robotic hull cleaners have been proposed. The "Hismar" consortium, for example, has proposed a robotic platform for hull cleaning during normal unloading conditions. The robot is magnetically attached to the hull when the vessel is stationary and is tethered to an operator control unit, a high pressure water source, a suction subsystem, and a power subsystem.

Other tethered robots are disclosed in U.S. Pat. Nos. 5,628,271; 6,317,387; 4,674,949; 4,401,048; 4,079,694; 3,946,692; and 3,638,600. See also WO 02/074611; "Design of a Remotely Operated Vehicle (ROV) for Underwater Ship Hull Cleaning," by Lee Min Wai Serene and Koh Cheok Wei; and "The Design of Underwater Hull-Cleaning Robot," by Fu-cai et al., published in *The Journal of Marine Science and Application*, Vol. 3, No. 1, June 2004. All of these references are hereby incorporated by reference herein.

Most prior hull cleaning robots suffer from several shortcomings. Typically, the robots are connected to a cable and powered and controlled by an on-board power supply and control subsystem and are able to operate only on a stationary vessel.

BRIEF SUMMARY OF THE INVENTION

It is therefore an object of this invention to provide a new hull robot. In one example, the hull robot is autonomous and able to operate while the vessel is underway. The hull robot may operate periodically, e.g., weekly, daily, or even continuously.

In one aspect, a hull cleaning robot can assist in lowering the frictional resistance of the vessel. Decreased fuel costs and lower carbon dioxide ($CO_2$) emissions are possible.

The hull cleaning robot may decrease the cost of defouling a vessel hull, reduce the release of antifouling paint toxins into the water during hull cleaning, and lower hull maintenance costs.

In one aspect of the subject invention, the hull cleaning robot is reliable and can be used for a variety of tasks on a variety of structures.

The subject invention results from the realization, in part, that a novel hull cleaning robot, in one example, includes turbines drivable by water flowing past the hull while the vessel is underway and operating (e.g., powering) the cleaning and the drive subsystems of the robot. Unique navigation, communication, and other subsystems are also disclosed.

The subject invention, however, in other embodiments, need not achieve all these objectives and the claims hereof should not be limited to structures or methods capable of achieving these objectives.

This invention features a hull cleaning robot comprising at least one cleaning apparatus for cleaning the hull of a vessel. At least one drive track holds the robot on the hull as the robot maneuvers about the hull. At least one turbine is actuatable by water flowing past the hull and operates the at least one cleaning apparatus and the at least one drive track.

In one preferred embodiment, a generator is drivable by the turbine and there is a motor for the at least one drive track and a power source for the motor. The power source is charged by the generator. Further included is a motor for the at least one cleaning apparatus and a power source for the motor. The power source is charged by the generator. In another example, there is a drive train between the turbine and the at least one drive track and a drive train between the turbine and the at least one cleaning apparatus.

In one example, the cleaning apparatus includes at least one cleaning brush. There may be two side brushes and a third brush between the two side brushes. In this specific example, the brushes are drivable together.

One preferred drive track includes an endless belt about spaced rollers. The robot belt may include magnets encapsulated therein. There is also a steering subsystem for the belt. One steering subsystem includes a motor driving an actuator linked to one roller to change its orientation.

The robot typically also includes a communication subsystem on board the robot such as a transmitter imparting vibrations into the hull and/or receiver responsive to vibrations transmitted through the hull.

One navigation subsystem for the robot includes at least one receiver responsive to the acoustic signals transmitted through the hull. Another navigation subsystem includes a probe on the robot responsive to variations in the hull.

A controller is typically configured to control the at least one drive track and to operate the at least one drive track in a first direction so that the robot proceeds along the hull in the direction of the water flowing past the hull and to then reverse the operation of the at least one drive track in an opposite direction so that the robot proceeds along the hull in a direction opposite the direction of the water flowing past the hull.

Preferably, the robot body has a hydrodynamic shape configured to urge the robot against the hull.

In one embodiment, a hull cleaning robot includes at least one cleaning apparatus for cleaning the hull of a vessel, at least one drive track including spaced rollers and an endless belt with magnetic material encapsulated therein about the spaced rollers to hold the robot on the hull as the robot maneuvers about the hull, and at least one turbine actuatable by water flowing past the hull for operating the at least one drive track. One preferred steering subsystem for the belt includes a motor driving an actuator linked to one roller to change its orientation.

One hull cleaning robot in accordance with the subject invention typically includes a robot body, a plurality of cleaning brushes rotationally disposed with respect to the robot body, a pair of spaced turbines each actuatable by flowing water, at least one drive track magnetically holding the robot on the hull as the robot maneuvers about the hull, and means, responsive to at least one turbine, for operating the drive track and the cleaning brushes. In one preferred embodiment, the means for operating the cleaning brushes includes a generator drivable by a turbine for charging a battery supplying the power to a motor which drives the brushes. The means for operating the at least one drive track may include a generator drivable by a turbine for charging a battery providing power too a motor driving the at least one drive track. In another example, the means for operating the cleaning brushes includes a drive train between the turbine and the cleaning brushes and the means for operating the at least one drive track including the drive train between one turbine and the at least one drive track.

A hull robot in accordance with the subject invention typically features a robot body, a drive subsystem moving the robot about the hull, and a turbine subsystem actuatable by fluid flowing past the hull for operating the drive subsystem. The hull robot may further include at least one cleaning apparatus such as at least one cleaning brush.

The subject invention also features a drive subsystem maneuvering a robot about a surface and at least one turbine with an exposed fluid intake powering the robot drive subsystem when fluid enters the intake.

The subject invention also features a hull cleaning robot comprising at least one cleaning apparatus for cleaning the hull of a vessel and at least one turbine actuatable by water flowing past the hull for operating the at least one cleaning apparatus. A drive subsystem is also typically provided for moving the robot about the hull. Typically, the drive subsystem is also powered by the same or a second turbine.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
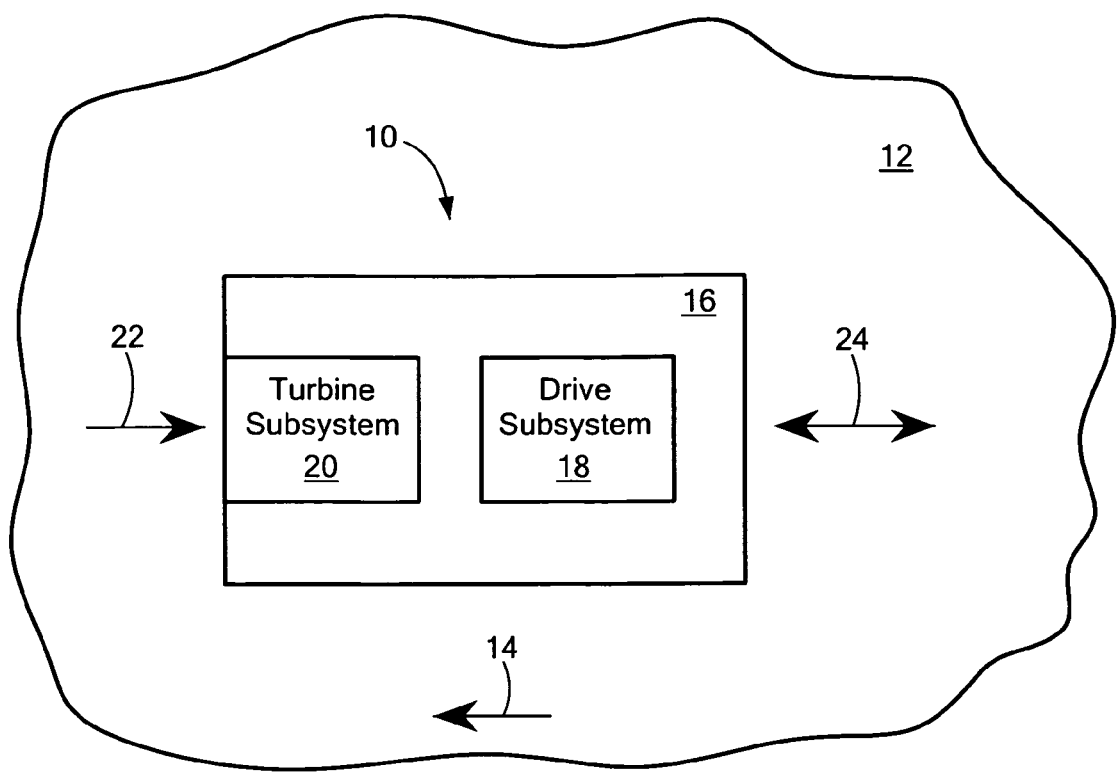
FIG. 1 is a highly schematic block diagram showing an example of a robot in accordance with the subject invention maneuvering on the hull of a vessel.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows robot 10 on vessel hull 12 (e.g., a ship) underway in the direction of vector 14. Robot body 16 houses drive subsystem 18 and turbine subsystem 20. Fluid (e.g., water) moves past hull 12 in the direction of vector 22 due to the motion of the vessel. In accordance with the subject invention, turbine subsystem 20 is actuatable (e.g., driven) by the moving fluid and used to operate at least drive subsystem 18.

The result is a robot able to maneuver, at a minimum, about hull 12 as shown by arrows 24. Furthermore, the robot is typically able to maneuver in a controlled path about the hull which is not aligned with vector 14 and in a direction as shown by arrows 24. The robot is powered by the action of the water flowing past the hull while the vessel is underway. In this way, cleaning and/or inspection and the like can be undertaken even continuously while the vessel is in operation. The robot is thus configured to harvest the energy it needs from the action of a fluid flowing past the robot.

Typically, other subsystems are included as components of robot 10, for example, a cleaning subsystem, a navigation subsystem, a communications subsystem, and the like, but preferably robot body 16 need not be tethered to any kind of an on-board power or control subsystem. The turbine subsystem can operate drive subsystem 18 (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. It is also possible for the generator to drive one or more motors directly.

Figure 2:
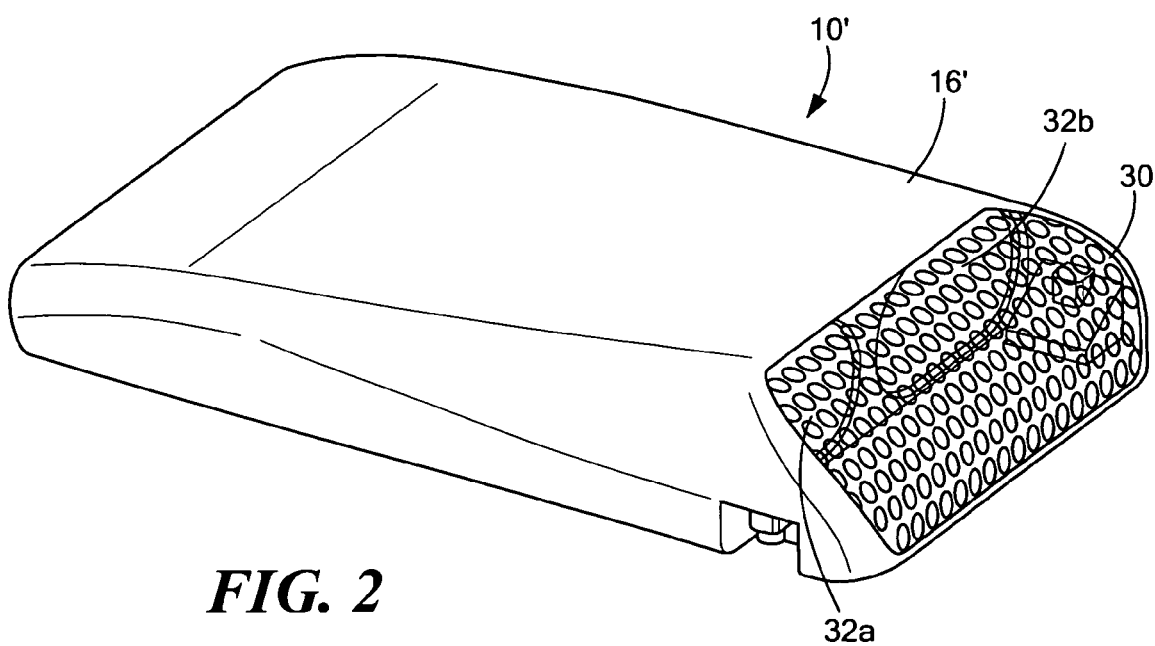
FIG. 2 is a schematic three-dimensional view of an example of a hull cleaning robot in accordance with the subject invention.
Figure 3:
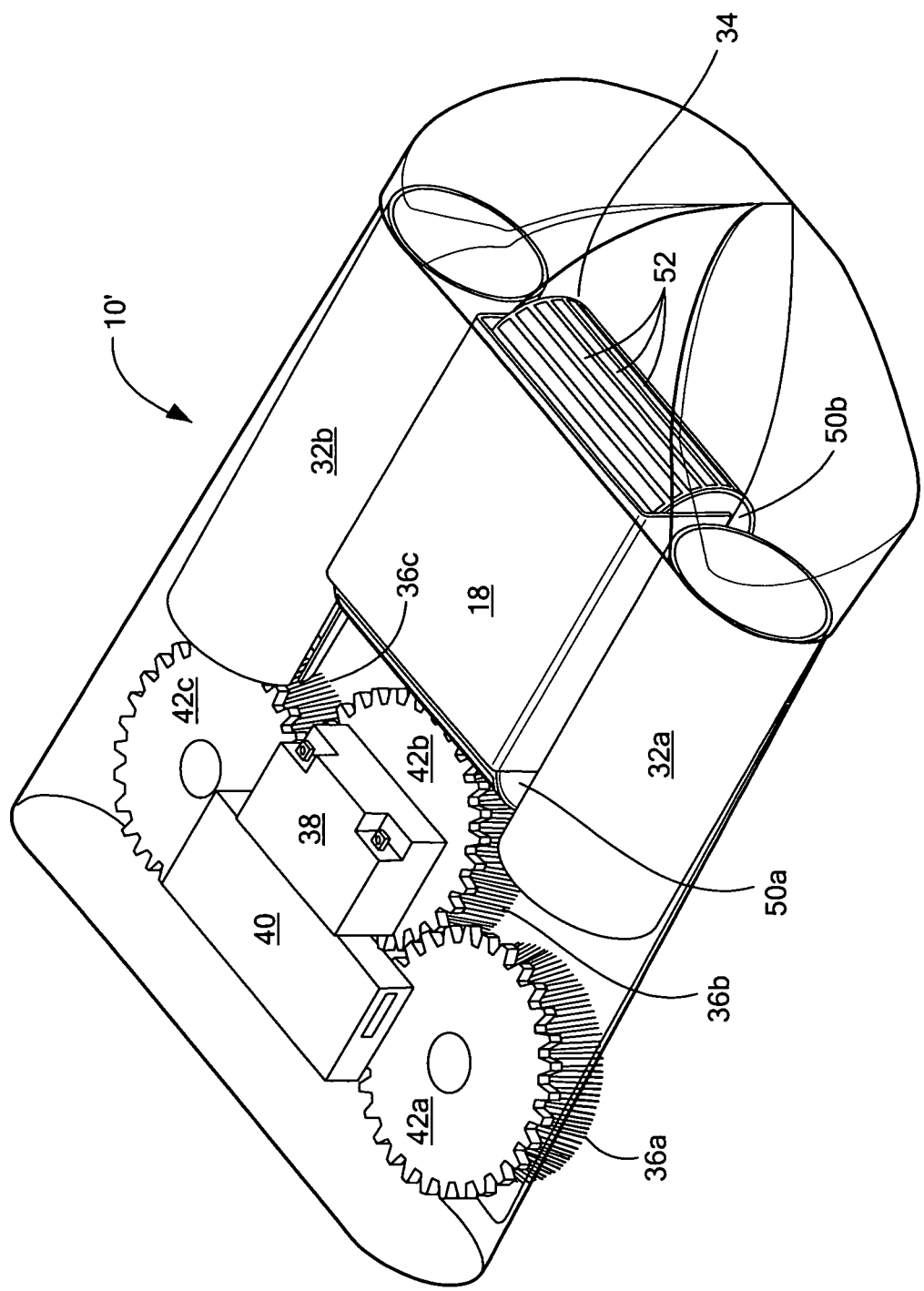
FIG. 3 is a schematic three-dimensional top cutaway view showing several of the primary subsystems associated with the hull cleaning robot shown in FIG. 2.
Figure 4:
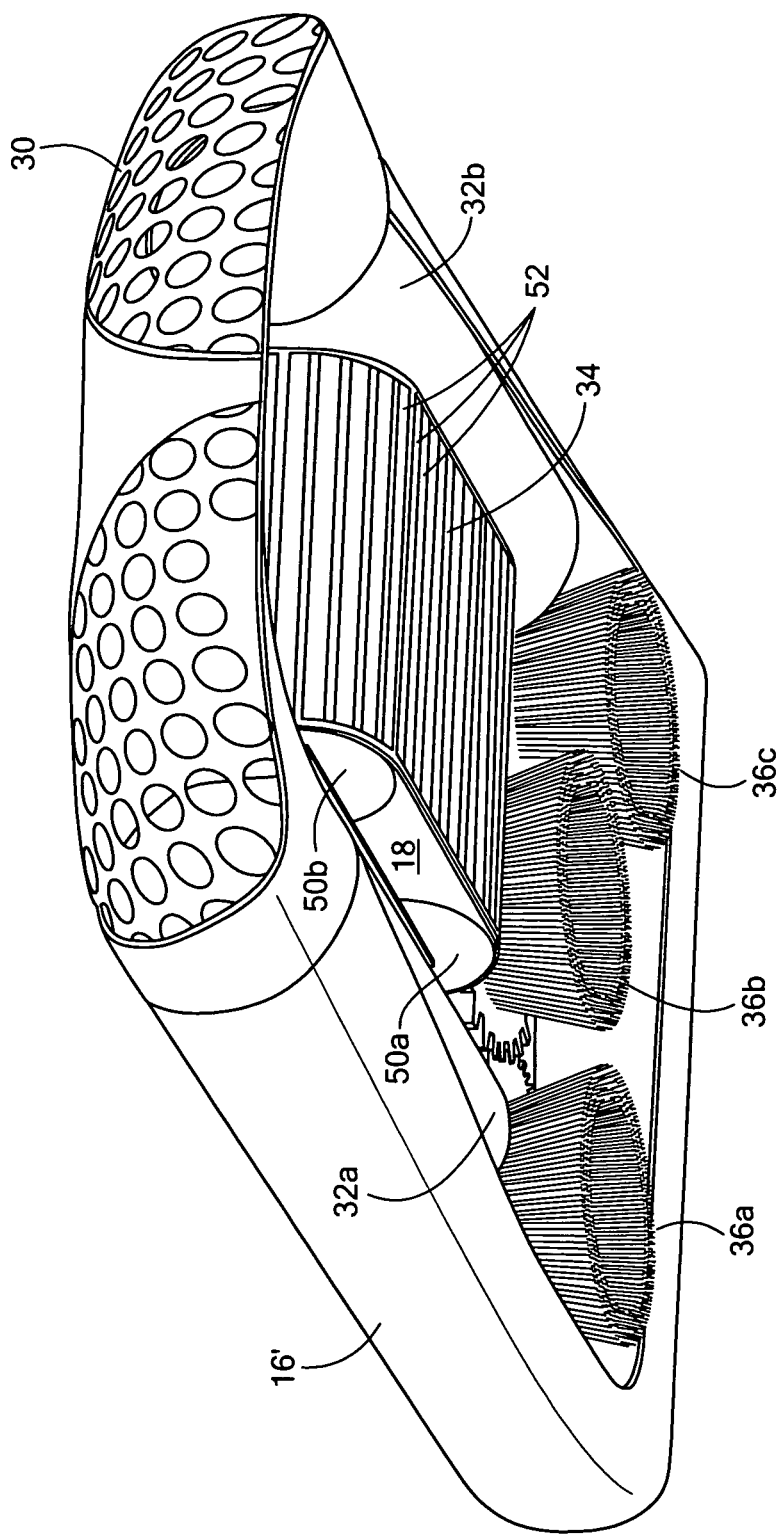
FIG. 4 is a schematic three-dimensional bottom front view of the hull cleaning robot shown in FIGS. 2-3.

In one particular example, robot 10', FIG. 2 includes body 16' with flow inlet filter screen 30. Body 16' preferably has the hydrodynamic shape shown or a similar shape. That is, it is configured (e.g., shaped) to urge the robot against the hull when deployed as water moves over the robot due to the action of the ship moving through the water. The intakes of turbines 32a and 32b can be seen behind screen 30. The intakes of turbines 32a and 32b are exposed, via screen 30, to fluid moving past the hull. In this example, robot housing 16' is approximately thirty-six inches long, twenty-four inches wide, and six inches tall. As shown in FIGS. 3-4, the drive subsystem in this example includes at least one drive track 34 configured to hold the robot on the hull as robot 10' maneuvers. Multiple drive tracks could be provided. Cleaning brushes 36a-36c, in this example, are included for cleaning the hull of the vessel. Battery pack 38 is shown as is electronic control module 40. Brushes 36a-36c may each be driven by gear drives 42a-42c, respectively, driven together. These gears may be driven by the shaft of turbine 32b or by a motor in an embodiment where the shaft of turbine 32b drives a generator providing power to battery pack 40 for the operation of the motor. Other cleaning subsystems are possible. For example, the robot could include a squeegee, a passive cleaning pad, water jets, and the like. For a passive cleaning apparatus, the turbine subsystem would not be used to operate the cleaning apparatus.

Turbine 32a can be used to drive track roller 50a directly in the case where the shaft of turbine 32a is coupled to roller 50a via a drive train. But, preferably, the shaft of turbine 32a is coupled to a generator powering motor which drives roller 50a.

In the example shown, endless belt 34 is disposed over rollers 50a and 50b and includes magnets and/or magnetic materials 52 embedded (e.g., encapsulated) in the material of the belt, typically rubber. In this way, belt 34 secures the robot to the hull of the vessel. Other magnetic subsystems used to engage a robot with the hull of a vessel are known to those skilled in the art.

Figure 5:
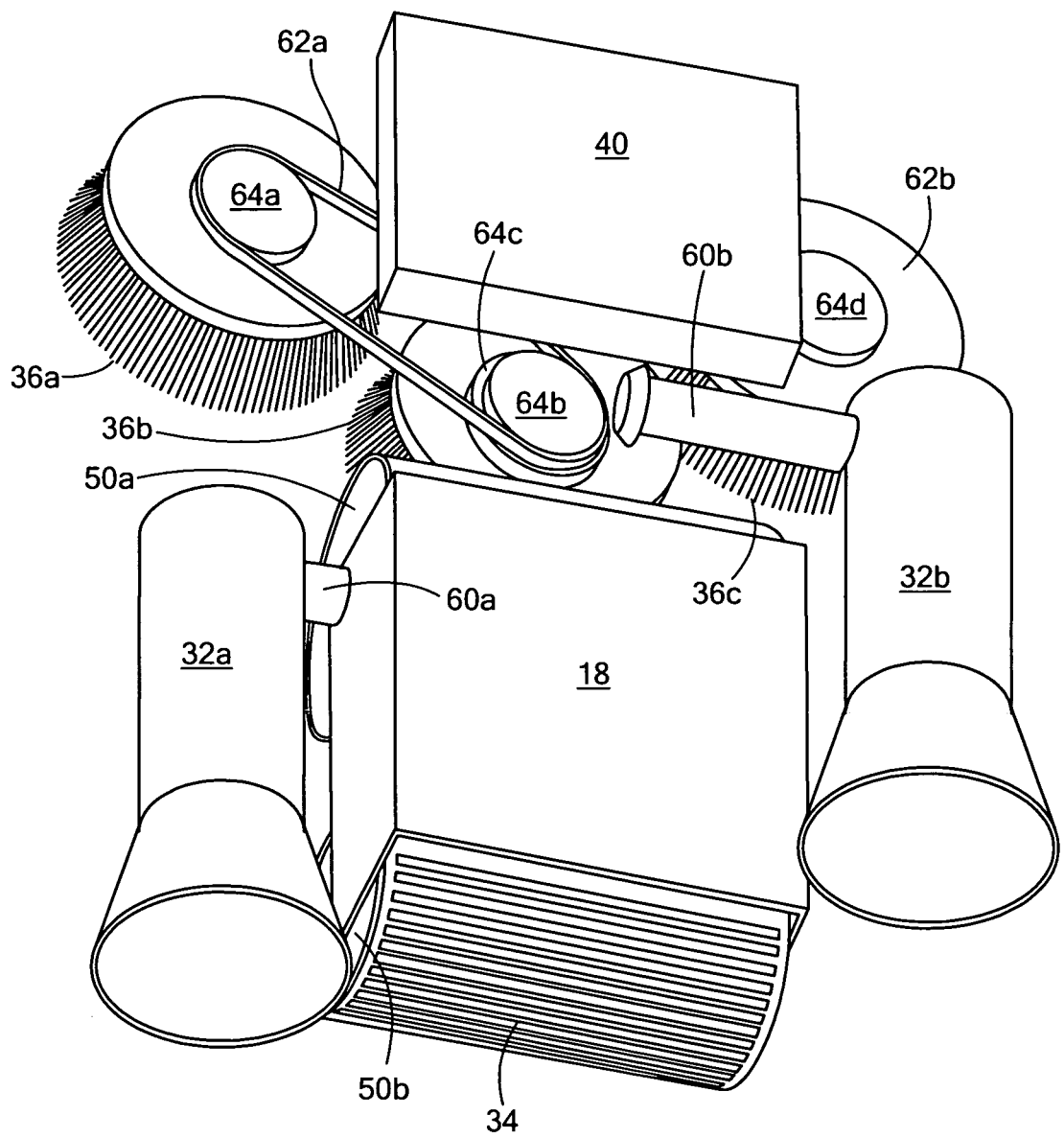
FIG. 5 is a schematic three-dimensional view showing several of the components associated with another embodiment of a hull cleaning robot in accordance with the subject invention.

In the example shown in FIG. 5, the shaft of turbine 32a is coupled to drive train 60a which drives track roller 50a and the shaft of turbine 32b is coupled to drive train 60b which drives brushes 36a-36c via belts 62a and 62b and pulleys 64a-64d. Other means for operating the at least one drive track and the cleaning apparatus are possible.

Figure 6:
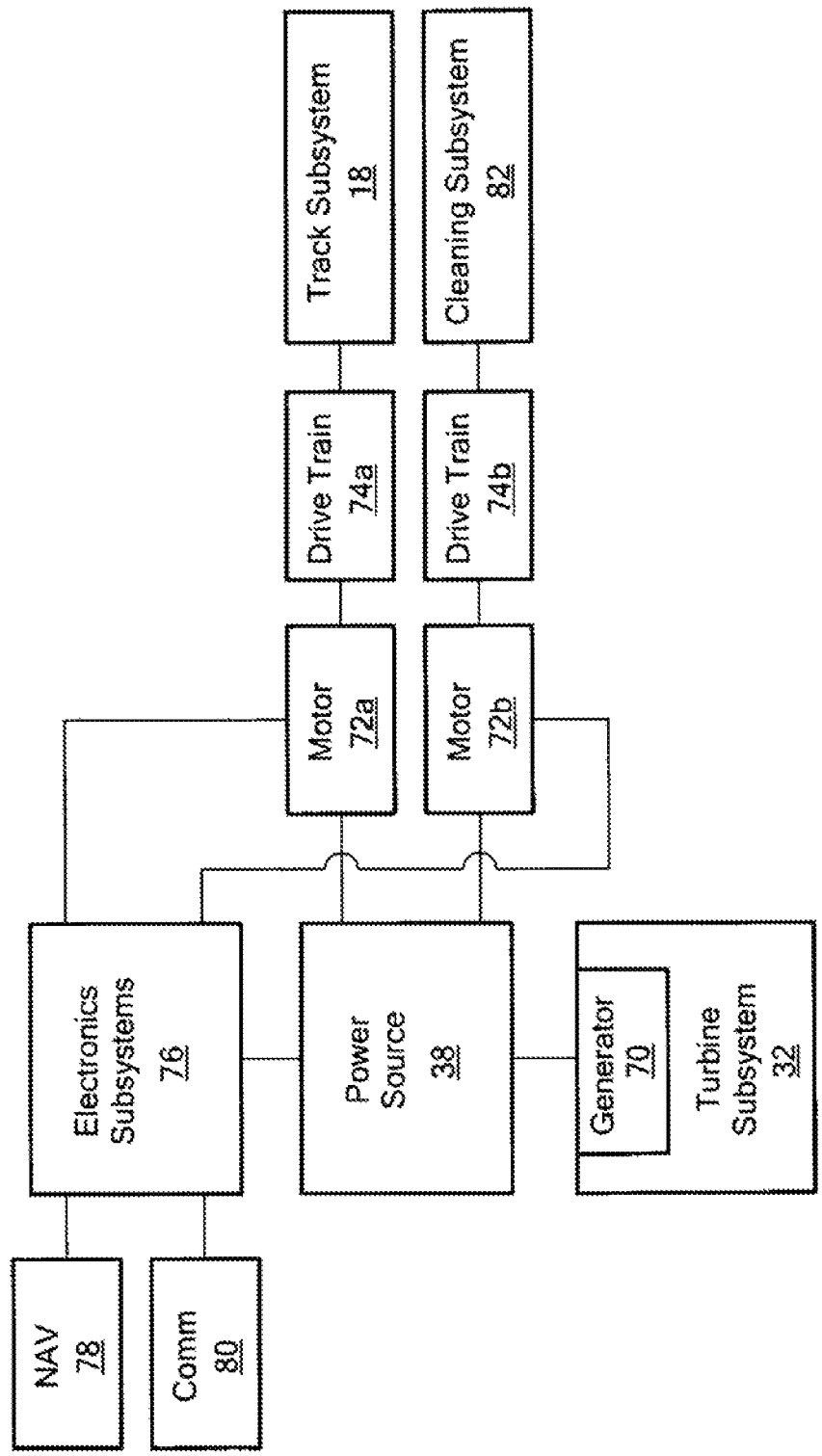
FIG. 6 is a block diagram showing the primary subsystems associated with one version of a hull cleaning robot in accordance with the subject invention.

FIG. 6, for example, illustrates a perhaps more preferred embodiment of the subject invention where turbine subsystem 32 (including one or more devices actuatable by fluid flowing past the hull) includes generator 70 which recharges power source 38. One or more motors such as motors 72a and 72b are powered by power source 38. Motor 72a drives track subsystem 18 via drive train 74a. The direction of travel of the robot can be reversed via electronic control subsystem 76 which is configured to reverse the direction of motor 72a based on inputs, for example, from navigation subsystem 78 and/or communication subsystem 80. Electronic controller 76 is also powered by power source 38. Similarly, motor 72b drives cleaning subsystem 82 (e.g., one or more brushes as described above) via drive train 74b. Motor 72b is also energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., a pad and/or a squeegee, motor 72b and drive train 74b would not be required.

If the cleaning subsystem is active, e.g., driven, it may be beneficial to operate the cleaning apparatus to assist in robot maneuvering operations. For example, two rotating cleaning brushes could be operated in opposite directions so there is no net force on the robot. With a larger single front and/or rear brush rotatable on an axle oriented transverse to the primary direction of robot travel, the brush could be operated to rotate opposite the direction of travel of the track when the robot is maneuvering in the direction of the water flowing past the hull (i.e., downstream). When the robot is maneuvering upstream, it may be desirable to run the brush in the same direction as the track. When the robot is maneuvering in a direction transverse to the water flow direction, it may also be desirable to operate the brush and the track in the same direction.

Figure 7:
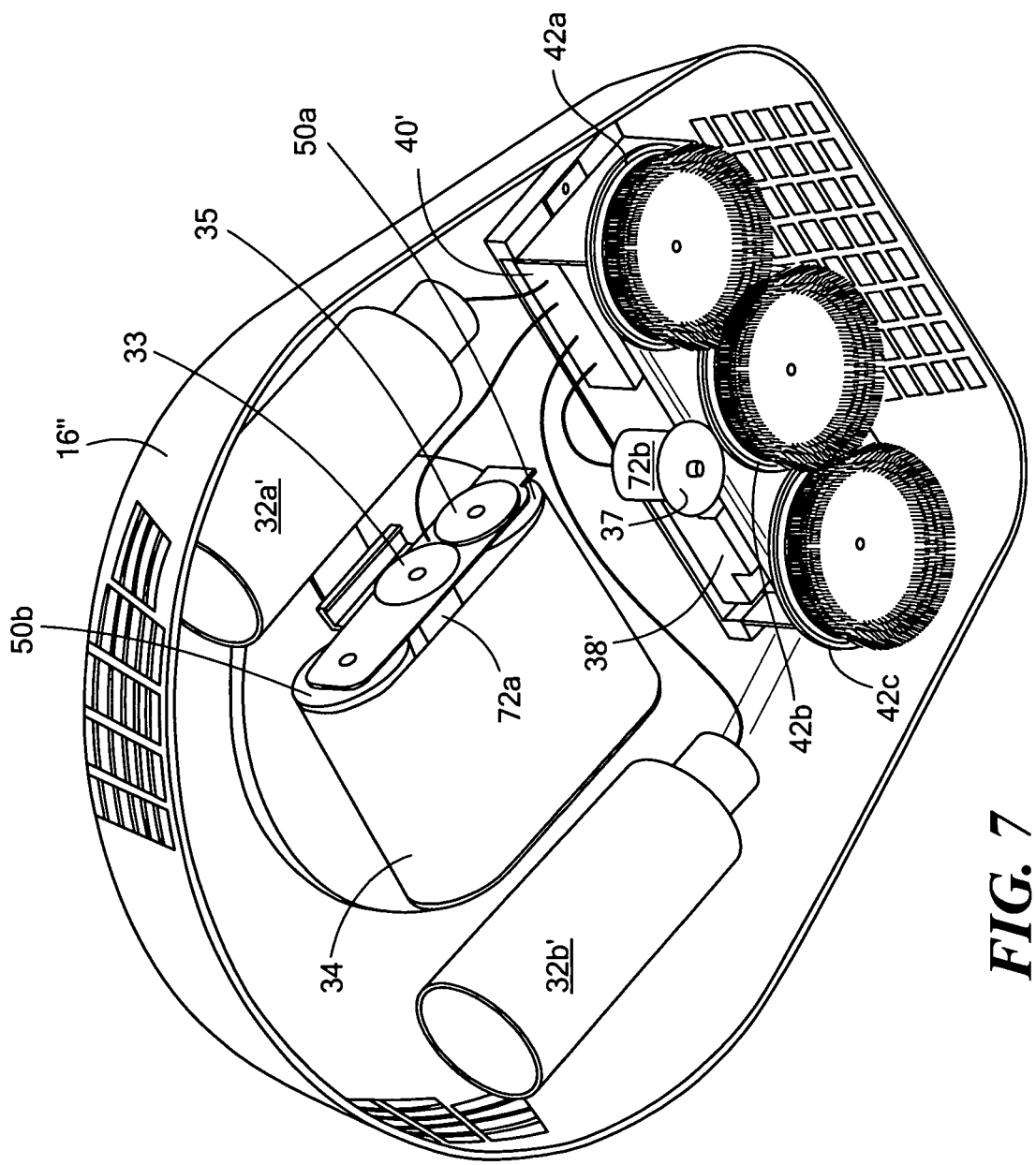
FIG. 7 is a schematic bottom view of a hull cleaning robot in accordance with the subject invention based on the design shown in FIG. 6.

FIG. 7 shows robot body 16" housing turbine/generator units 32a' and 32b' which, when deployed, charge battery 38' via controlling electronics 40'. Battery 38 provides power (via controlling electronics 40') to drive belt motor 72a which turns gear 33 driving gear 35 of drive belt roller 50a. Battery 38 also provides power (via controlling electronics 40') to brush motor 72b which turns gear 37 cooperating with gear 42b itself driving cleaning brush gears 42a and 42c. Controlling electronics 40' (typically employing a microprocessor, power circuits, and the like), is also powered by battery 38.

Figure 8:
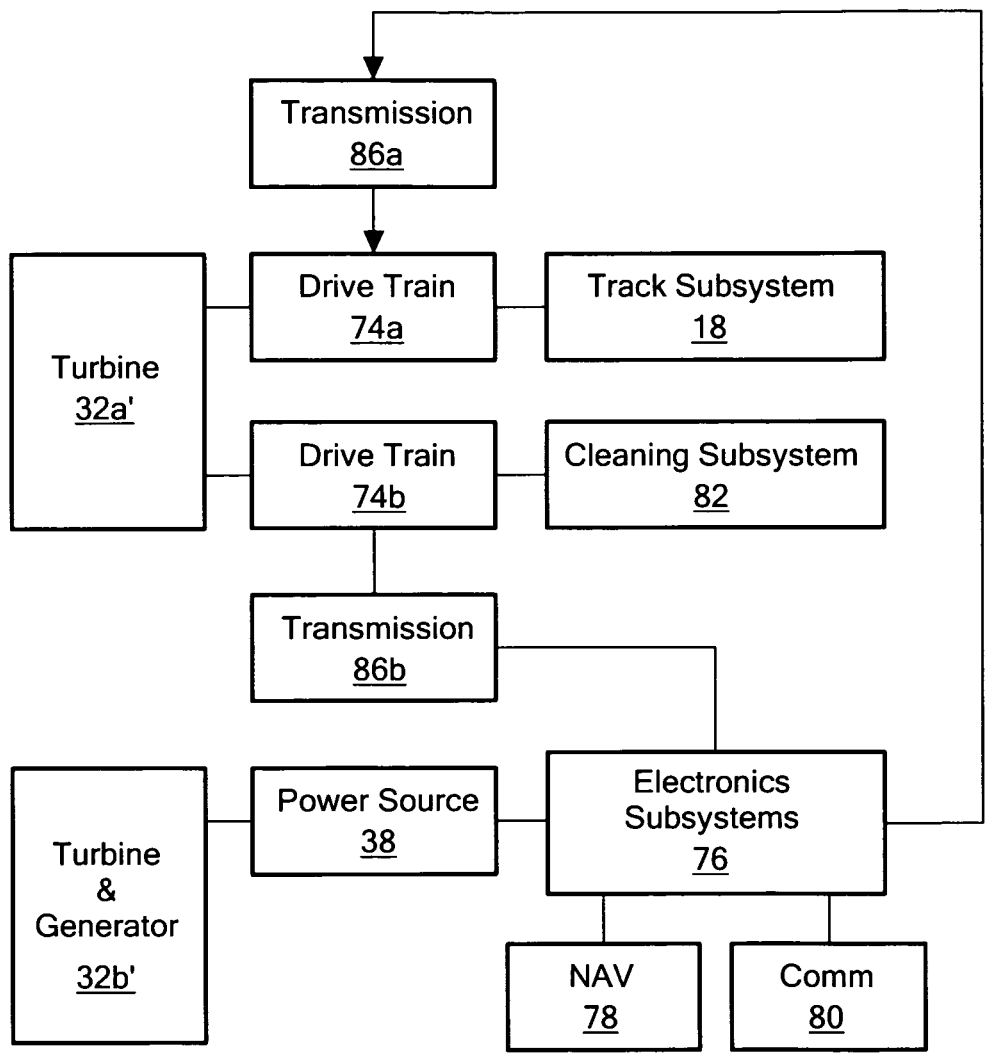
FIG. 8 is a block diagram showing the primary subsystems associated with another version of a hull cleaning robot in accordance with the subject invention.

FIG. 8 illustrates a more direct drive version where turbine 32a', via drive train 74a, drives drive subsystem 18. Turbine 32a', via drive train 74b, also drives cleaning subsystem 82 if it is active. Transmission 86a, under the control of electronic controller subsystem 76, may be associated with drive train 74a to control the operation, speed, and direction of the track subsystem 18. Similarly, transmission 86b, under the control of electronic subsystem 76, may be used to adjust the operation of cleaning subsystem 82. Electronic control subsystem 76 can receive inputs from navigation subsystem 78 and/or communication subsystem 80.

Figure 9:
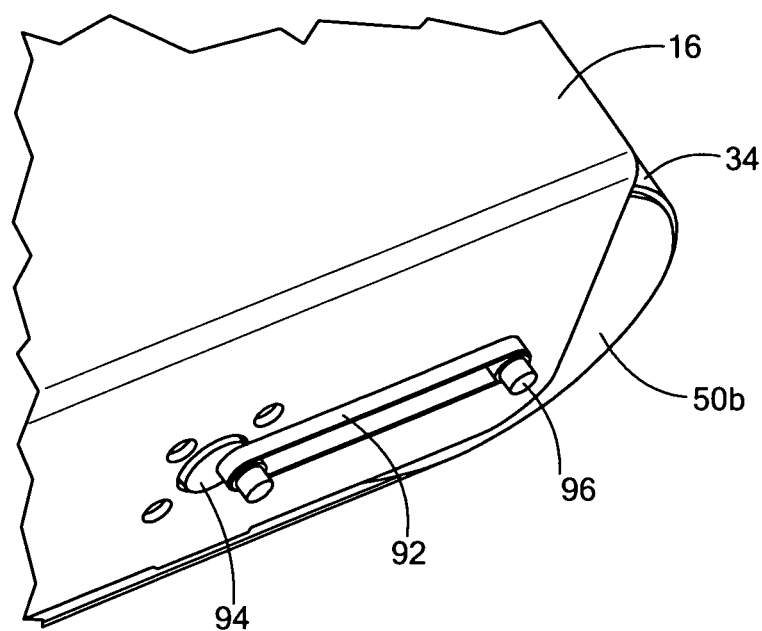
FIG. 9 is a schematic partial view of an example of a robot steering mechanism in accordance with the subject invention.
Figure 10:
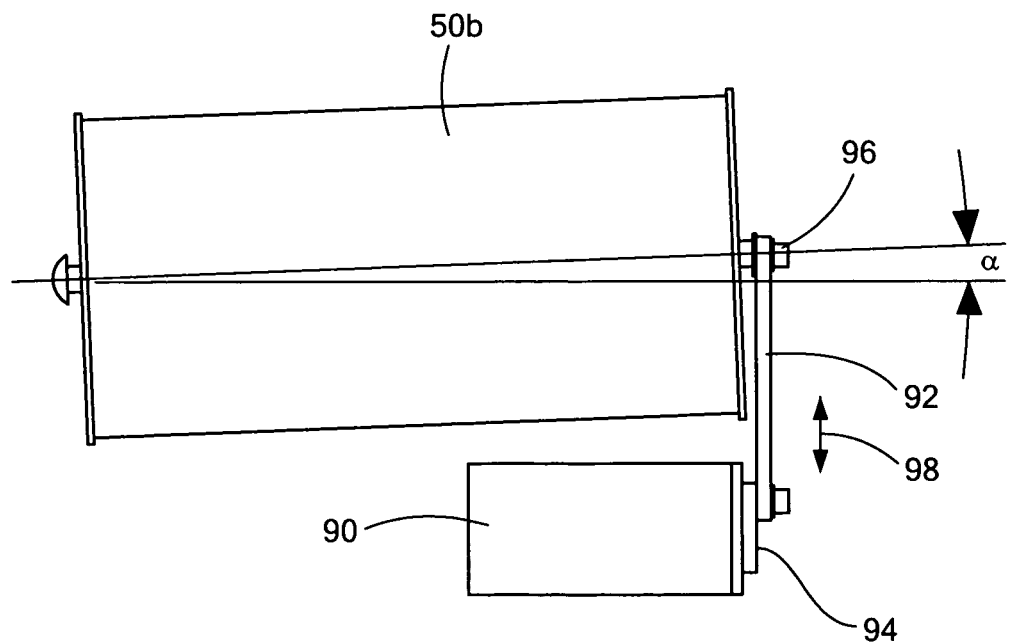
FIG. 10 is another highly schematic view showing in more detail the steering mechanism shown in FIG. 9.

FIGS. 9-10 show an example of a steering subsystem including motor 90 (powered by battery pack 38, FIG. 3) and actuator 94 rotated by motor 90. Roller 50b is angled with respect to the robot chassis in this particular example via linkage 92 between actuator 94 and roller shaft 96 to angle shaft 96 (see angle α in FIG. 10). Actuator 94 rotates to drive linkage 92 to and from in the directions shown by arrow 98. As a result, roller 50b is angled to steer the robot. Other steering subsystems are possible. See, for example, U.S. Pat. Nos. 3,934,664; 4,046,429; and 4,119,356 incorporated herein by this reference. If two drive tracks are used, steering can be effected via differentially operating the tracks.

A variety of communication and navigation subsystems are possible in connection with a hull cleaning and/or inspection system in accordance with the subject invention. In one particular example, transducer 100, FIG. 11 includes striker 102 driven by solenoid 104 to strike the hull structure 12. The resulting acoustic signature can be detected by the robot on the exterior side of the hull. A simple message can, for example, instruct the robot to reverse direction or to maneuver to a prescribed pick up location above the water line. Alternatively, or in addition, the robot can be equipped with such a transducer to effect, for example, two-way communications through the vessel hull.

Figure 11:
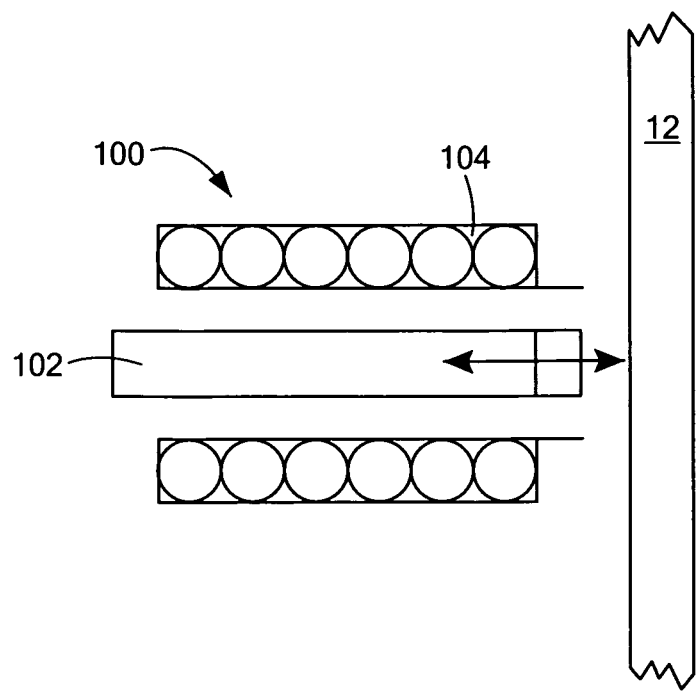
FIG. 11 is a highly schematic view of a tone source which can be used for communication and navigation in accordance with the subject invention.
Figure 12:
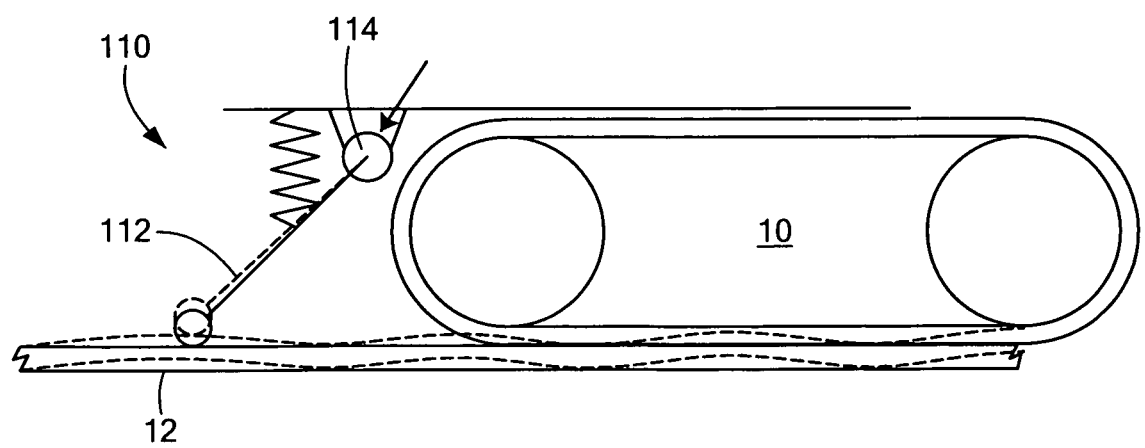
FIG. 12 is a highly schematic side view showing an example of a tone receiver used in connection with a hull robot in accordance with the subject invention for both communication and navigation.

FIG. 12 shows robot 10 equipped with receiver 110 in the form of pick up head 112 and position sensor 114 (e.g., a potentiometer/encoder) responsive thereto for detecting vibrations in hull 12 due to striker 102, FIG. 11. Using acoustic through-the-hull communications, the robot can be instructed by an on-board computer. One tone, for example, may signal a reverse direction command, two tones can invoke a steer left command, and the like. By using different tone series and/or frequencies, more complex messages can be sent to (and optionally received from) the robot. Other communications systems, however, are possible.

Figure 13:
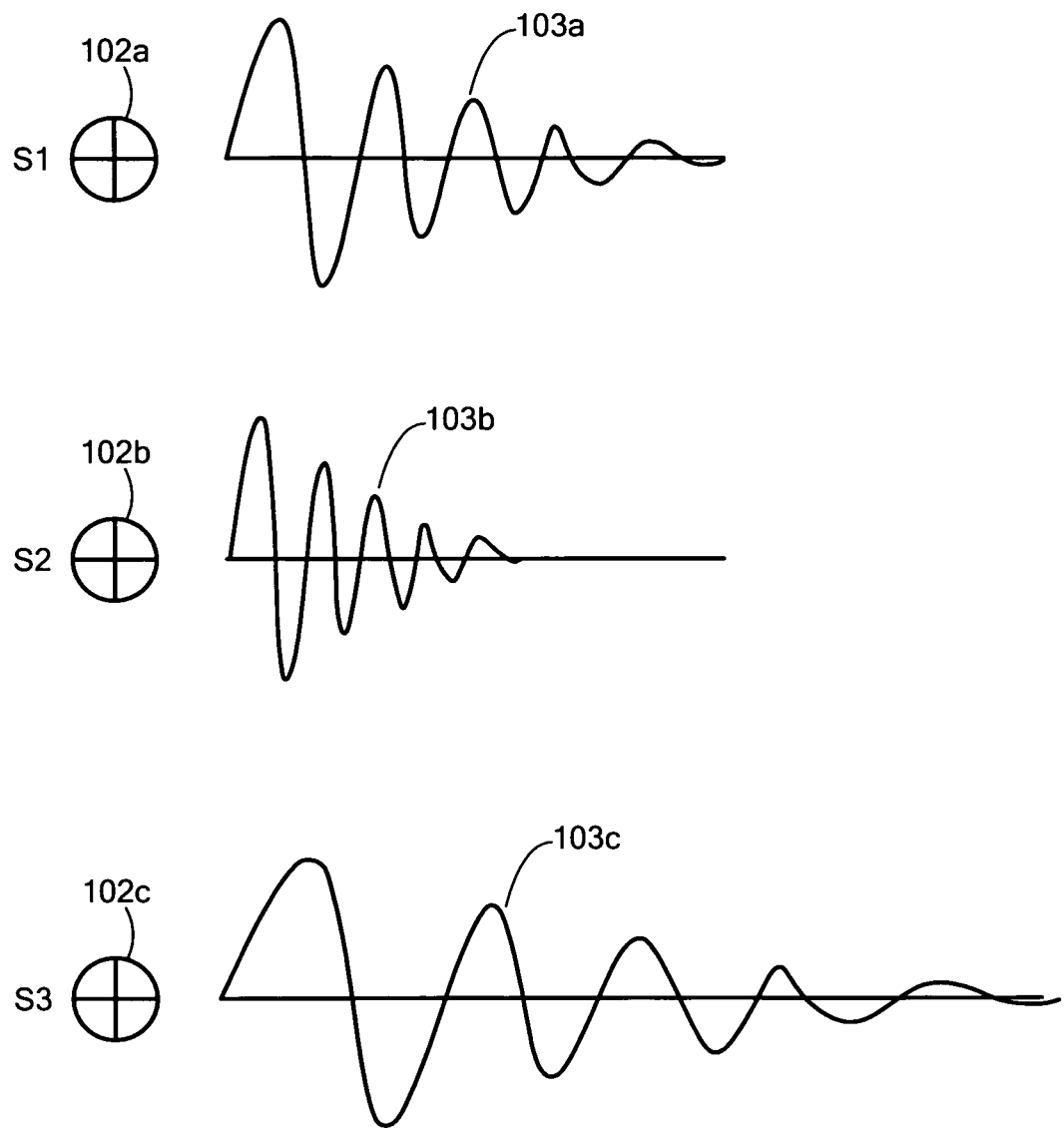
FIG. 13 is a schematic view showing several different acoustic signals illustrating an example of an acoustic positioning system for use in the subject invention.

By employing multiple strikers 102a-102c, FIG. 13, navigation is also possible. Striker 102a is driven to send out an acoustic signal at a first frequency as shown at 103a, striker 102b is driven to provide a signal through the hull at a second frequency 103b, and striker 102c is driven to provide a third acoustic signal at a frequency 103c through the hull. At the robot, the signals are detected (using the receiver shown in FIG. 12, for example), filtered, and converted into a digital signal via an analog-to-digital converter. The tone signals are separated and the time delays between signals are determined by an electronic subsystem associated with the robot in order to triangulate the position of the robot on the hull. Thus, electronic control module 40, FIG. 3, for example, typically includes software and/or circuitry for communication, navigation, and robot maneuvering/control.

Figure 14A:
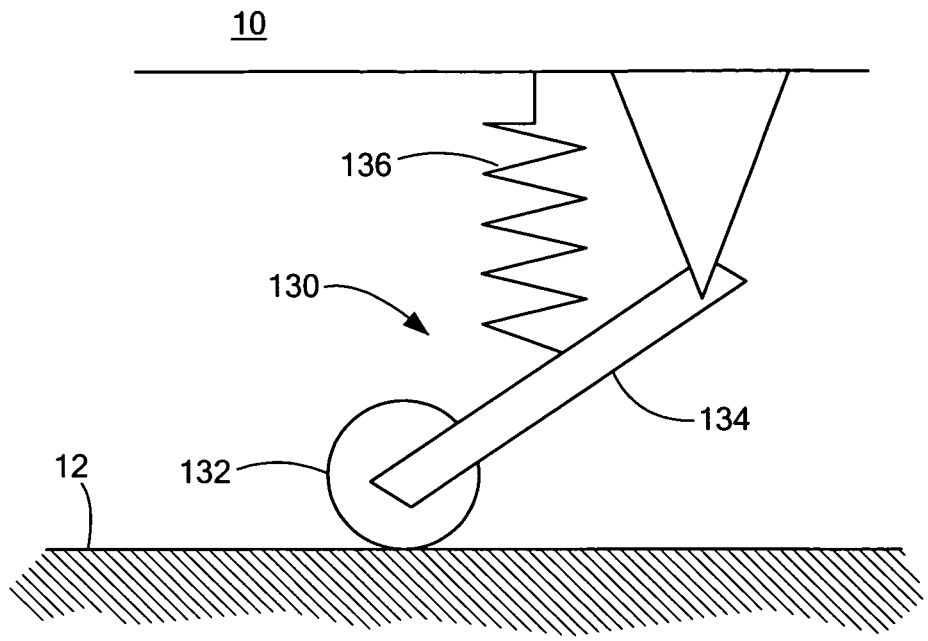
FIGS. 14A-14B are highly schematic side views of a navigation probe useful in another embodiment of the subject invention.
Figure 14B:
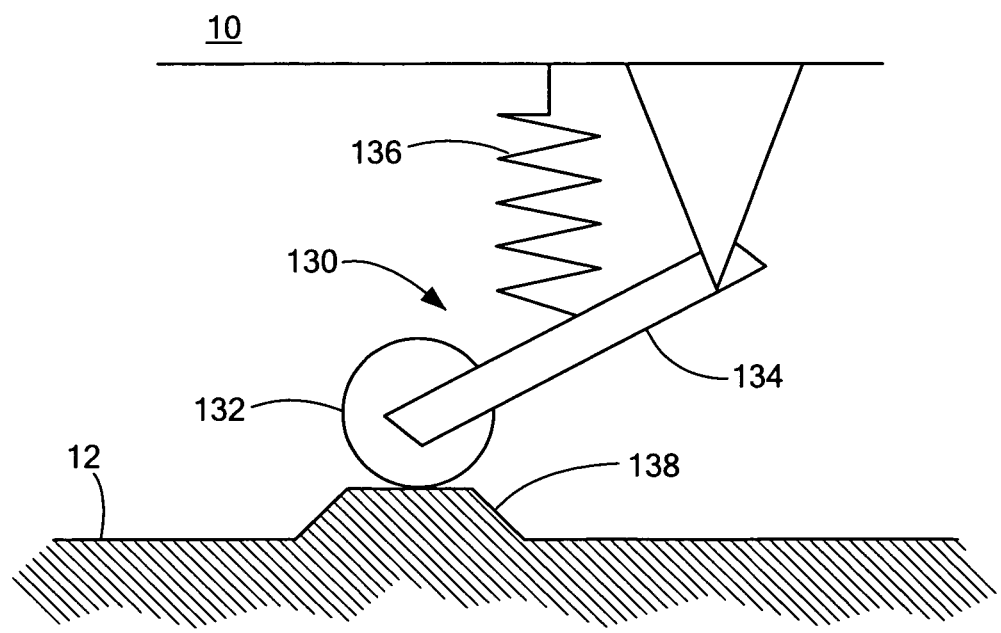

In another example, features of the hull are mapped and detected by the robot in order to determine the position of the robot on the hull. FIG. 14 shows probe 130 associated with the robot including roller 132, arm 134, and sensor or switch 136 responsive to arm 134. When roller 132 raises due to a construction weld or by design landmark weld 138, FIG. 14B, sensor 136 detects this event and the robot control subsystem is configured to reference a stored map of such features to establish the position of the robot on the hull. In one simple design, as the robot proceeds along the length of the hull, it simply keeps track of how many weld lines it has encountered and, after passing a preset number of weld lines, it turns slightly, reverses its direction, and proceeds backwards along the length of the hull for cleaning and/or inspection operations.

Figure 15:
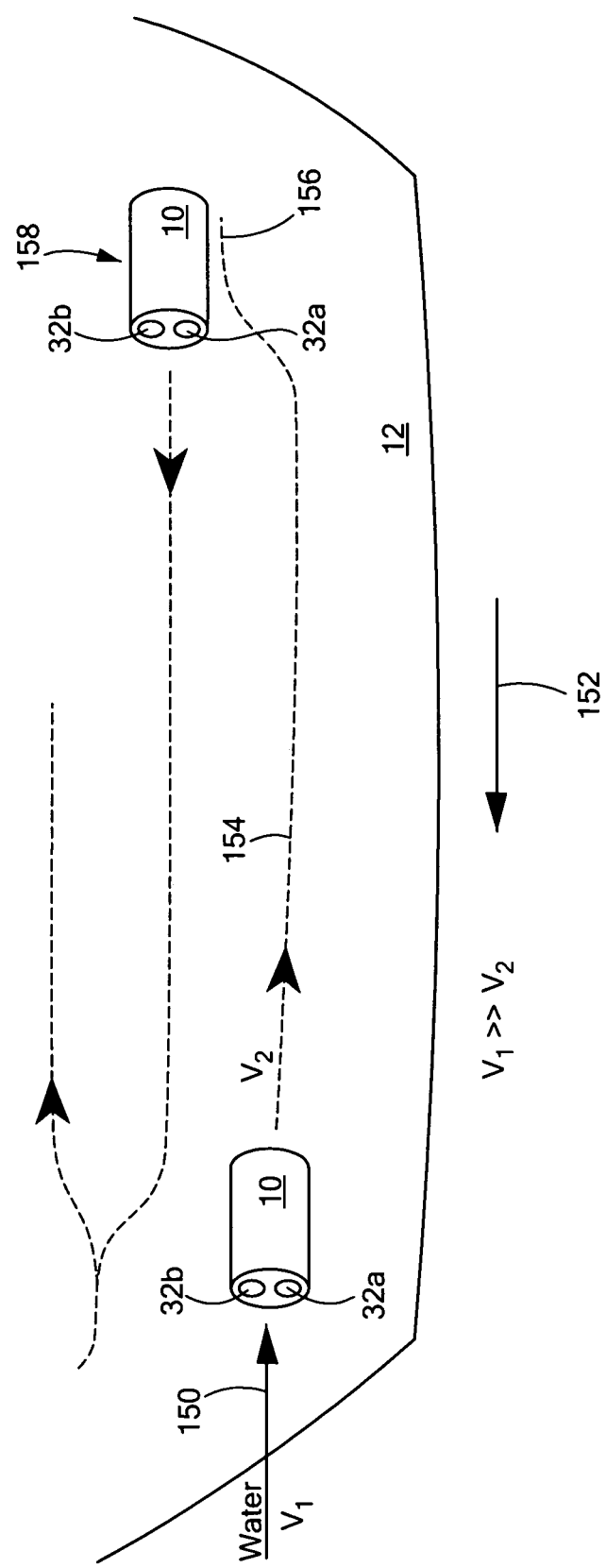
FIG. 15 is a highly schematic depiction of an embodiment of a hull robot in accordance with the subject invention maneuvering along the length of a ship hull.

Typically, robot 10, FIG. 15 is always oriented with the intake of turbines 32a and 32b facing the direction of the water flowing past hull 12 as shown by vector 150. Hull 12 is moving in the direction of vector 152. Under power derived from turbine 32a and/or 32b, robot 10 moves along path 154 at a fairly slow velocity, e.g., a velocity much slower than the speed of the vessel. Near the edge of the vessel hull, robot 10 turns slightly as shown at 156, stops, and then reverses direction as shown at 158. The direction of the motor operating the robot drive subsystem can be reversed or a transmission subsystem can be employed, as discussed above. In this way, the water flow direction is always into the robot turbine intakes. Turning of the robot is discussed above with reference to FIGS. 9-10. Other robot behaviors, however, are possible. Typically, the robot is controlled by software and/or circuitry associated with control module 40, FIG. 3. Also, more than one robot could be deployed on the hull at the same time.

Figure 16:
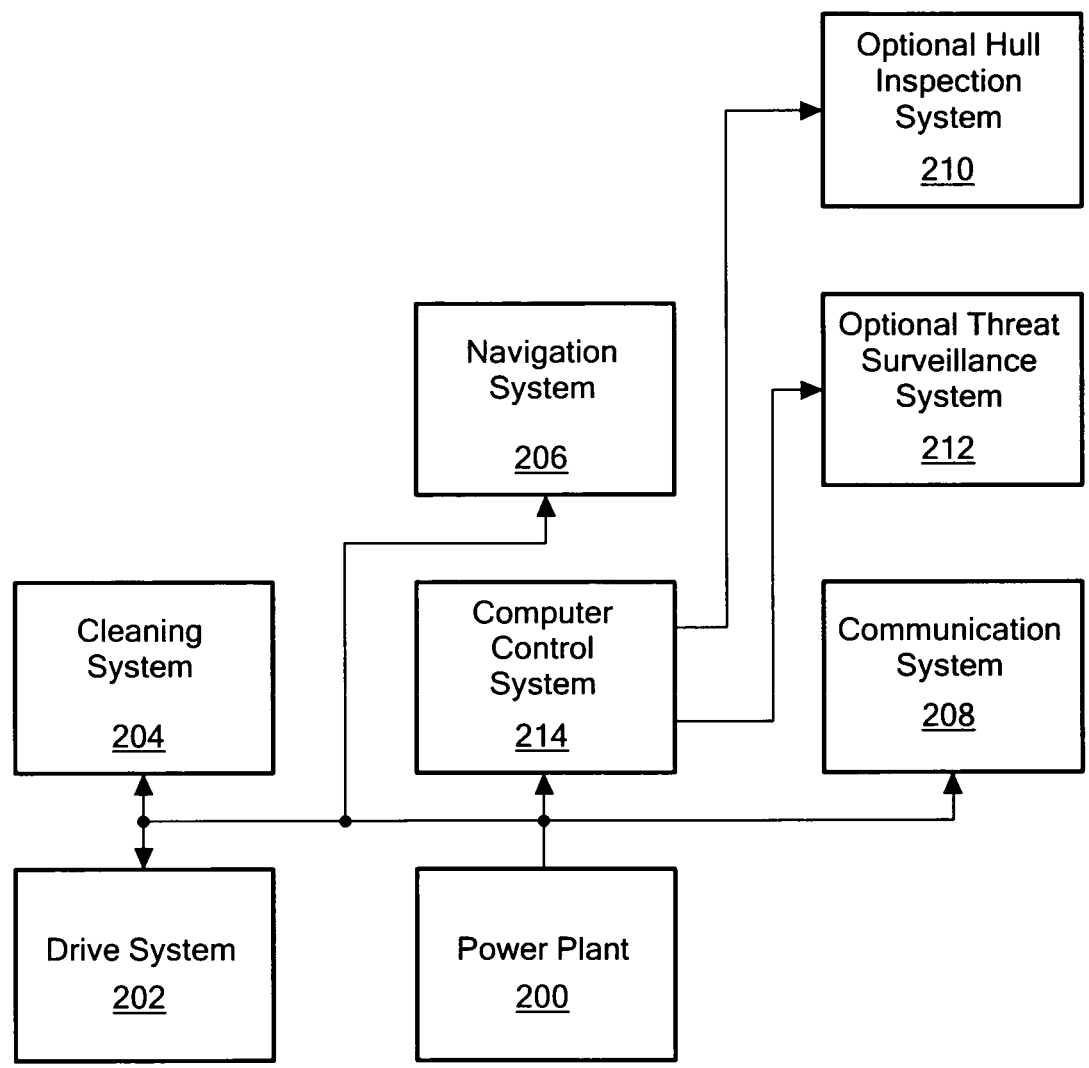
FIG. 16 is a block diagram showing several of the primary subsystems associated with an example of a robot platform in accordance with the subject invention.

Thus, in general, the robot platform power plant 200, FIG. 16, includes some kind of a turbine subsystem as discussed above. The turbines used could include a shaft rotated by vanes attached to the shaft or the turbine could include other structure activated by moving fluid, e.g., impellers and the like. Robot drive subsystem 202 may include the at least one magnetic track disclosed above or other means for adhering the robot to the hull. Typically, there is some kind of a cleaning subsystem 204 such as the brushes discussed above. A navigation system 206 and a communication system 208 are also typically provided. In some embodiments, the robot platform includes an inspection subsystem 210 and/or a threat surveillance subsystem 212. Some type of a computerized control subsystem 214 is configured to operate these various subsystems.

The result, in one embodiment, is a new hull robot typically used to clean the hull of a vessel a continuous fashion while the vessel is underway to lower the resistance of the hull which in turn saves fuel costs, lower emissions and reduces seawater contamination. One or more turbines associated with the robot are actuatable by water flowing past the robot and are typically used to operate the robot cleaning apparatus, the drive subsystem, and the like.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the examples discussed herein relate primarily to vessels operating in the water. The body of other structures, however, may be cleaned, inspected, or the like, using a version of the robot disclosed herein.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A hull cleaning robot comprising:
   a body;
   at least one cleaning apparatus for cleaning the hull of a vessel;
   at least one drive track holding the robot on the hull as the robot maneuvers about the hull; and
   at least one turbine driven by water flowing into the body of the robot as generated by the vessel being in motion and underway, the turbine being oriented substantially parallel to the hull, and in a direction of the water flow within the body, the turbine operating the at least one cleaning apparatus and the at least one drive track,
   wherein the robot is adapted to operate underwater and within the water flow to maneuver about and clean the hull of the vessel.

2. The robot of claim 1 further including a generator drivable by the turbine.

3. The robot of claim 2 further including a motor for the at least one drive track and a power source for the motor and chargeable by the generator.

4. The robot of claim 2 further including a motor for the at least one cleaning apparatus and a power source for the motor and chargeable by the generator.

5. The robot of claim 1 further including a drive train between the turbine and the at least one drive track.

6. The robot of claim 1 further including a drive train between the turbine and the at least one cleaning apparatus.

7. The robot of claim 1 in which the cleaning apparatus includes at least one cleaning brush.

8. The robot of claim 7 in which there are two side brushes and a third brush between the two side brushes.

9. The robot of claim 8 in which the brushes are drivable together.

10. The robot of claim 1 in which the at least one drive track includes an endless belt about spaced rollers.

11. The robot of claim 10 in which the belt includes magnets encapsulated therein.

12. The robot of claim 10 further including a steering subsystem for the belt.

13. The robot of claim 12 in which the steering subsystem includes a motor driving an actuator linked to one roller to change its orientation.

14. The robot of claim 1 further including a communication subsystem on board the robot for communicating with the robot.

15. The robot of claim 14 in which the communication subsystem includes a transmitter imparting vibrations into the hull and/or a receiver responsive to vibrations transmitted through the hull.

16. The robot of claim 1 further including a navigation subsystem for the robot.

17. The robot of claim 16 in which the navigation subsystem includes at least one receiver responsive to acoustic signals transmitted through the hull.

18. The robot of claim 16 in which the navigation subsystem includes a probe on the robot responsive to variations in the hull.

19. The robot of claim 1 further including a controller configured to control the at least one drive track.

20. The robot of claim 19 in which the controller is configured to operate the at least one drive track in a first direction so that the robot proceeds along the hull in the direction of the water flowing past the hull and to then reverse the operation of the at least one drive track in an opposite direction so that the robot proceeds along the hull in a direction opposite the direction of the water flowing past the hull.

21. The robot of claim 1 in which the robot has a hydrodynamic shape configured to urge the robot against the hull by water flowing past the hull over the robot while the vessel is underway.

22. A method for cleaning a hull of a vessel, comprising:
obtaining a hull cleaning robot, comprising:
a body;
at least one cleaning apparatus,
at least one drive track to hold the robot on a hull as the robot maneuvers about the hull, and
at least one turbine driven by water flowing into the body of the robot as generated by the vessel being in motion and underway, the turbine being oriented substantially parallel to the hull, and in a direction of the water flow within the body, wherein the robot is adapted to operate underwater and within the water flow to maneuver about and clean the hull of the vessel,
disposing the hull cleaning robot about an underwater portion of a hull of a vessel; and
operating the vessel, wherein water is caused to flow past the hull to actuate the turbine and operate the at least one cleaning apparatus and the at least one drive track.

* * * * *